United States Patent
Feiring et al.

(10) Patent No.: US 7,297,398 B2
(45) Date of Patent: Nov. 20, 2007

(54) FLUOROPOLYMER LOW REFLECTING LAYERS FOR PLASTIC LENSES AND DEVICES

(75) Inventors: Andrew Edward Feiring, Wilmington, DE (US); Satoko Iwato, Tokyo (JP); Mureo Kaku, Tochigi (JP); Takahasi Tatsuhiro, Jamagata (JP); Ronald Earl Uschold, West Chester, PA (US); Robert Clayton Wheland, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 71 days.

(21) Appl. No.: 10/355,202

(22) Filed: Jan. 30, 2003

(65) Prior Publication Data

US 2004/0037967 A1 Feb. 26, 2004

Related U.S. Application Data

(63) Continuation of application No. 09/913,045, filed as application No. PCT/US00/07263 on Mar. 15, 2000, now abandoned.

(51) Int. Cl.
- *B32B 17/10* (2006.01)
- *B32B 27/08* (2006.01)
- *B32B 27/30* (2006.01)
- *B32B 27/36* (2006.01)

(52) U.S. Cl. .......... 428/336; 428/411.1; 428/412; 428/421; 428/426; 428/480; 428/522

(58) Field of Classification Search ........... 526/250, 526/254, 255; 428/336, 411.1, 412, 421, 428/426, 480, 522
See application file for complete search history.

(56) References Cited

U.S. PATENT DOCUMENTS

| | | | |
|---|---|---|---|
| 3,652,328 A * | 3/1972 | Dork et al. ............. | 428/335 |
| 4,657,805 A * | 4/1987 | Fukumitsu et al. ...... | 428/215 |
| 5,008,156 A * | 4/1991 | Hong .................... | 428/506 |
| 5,053,470 A | 10/1991 | Wu | |
| 5,132,164 A | 7/1992 | Moriya et al. | |
| 5,723,556 A | 3/1998 | Jones | |
| 5,798,158 A | 8/1998 | Koike et al. | |
| 5,846,650 A * | 12/1998 | Ko et al. .............. | 428/336 |
| 5,880,234 A | 3/1999 | Maeda et al. | |

FOREIGN PATENT DOCUMENTS

| | | |
|---|---|---|
| EP | 0 050 436 A2 | 4/1982 |
| EP | 0 416 517 A2 | 3/1991 |
| EP | 0 889 066 A1 | 1/1999 |
| JP | 8 142 280 | 6/1996 |
| WO | WO 91/15610 A1 | 10/1991 |
| WO | WO 96/24625 A2 | 8/1996 |
| WO | WO 97/01599 A1 | 1/1997 |

OTHER PUBLICATIONS

Japanese Abstrct, JP 08142280, Reflect Prevent Film Improve Wear Resistance comprise Light Screen Plastic Sheet Reflect Prevent Layer Forming Sheet Apply Non Crystal Fluoro Resin Specified Refract Index Coating Layer, XP 002151596, Fukubi Kagaku Kogyo KK, Jun. 4, 1996.

Japanese Abstrct, JP 09096701, Anti Reflect Film Produce Comprise Forming Layer Transparent Substrate Forming Layer Vacuum Deposit Layer Control Deposit Rater, XP 002151597, Nikon Corp., Apr. 8, 1997.

* cited by examiner

*Primary Examiner*—Ramsey Zacharia

(57) ABSTRACT

A one or two layer coating system has been developed for plastic substrates. The one coating system low reflective layer consists of a fluorinated copolymer having the formula: VF2/TFE/HFP, VF2/HFP or VF2/TFE/PMVE. In the two coating system, the upper coating layer consists of TFE/HFP, $VF_2$/TFE/HFP, or TFE/Perfluorodioxole, and the lower coating layer consists of $VF_2$/TFE/HFP, VF/TFE/HFP, VAc/TFE/HFIB, or TFE graft to PVOH.

6 Claims, No Drawings

FLUOROPOLYMER LOW REFLECTING LAYERS FOR PLASTIC LENSES AND DEVICES

This application is a continuation of U.S. patent application Ser. No. 09/913,045, filed 8 Aug. 2001, now abandoned, which is the national stage entry of PCT/US00/07263, filed 15 Mar. 2000.

FIELD OF INVENTION

The present invention relates to fluoropolymer coated plastics. More specifically, it relates to fluoropolymer coated plastics having good adhesion, low reflective properties, and water and oil repellency.

TECHNICAL BACKGROUND

Much work has been done concerning low reflective plastics, particularly for plastic lenses and optical devices. One method used is vapor disposition of oxidized metal on the surface of the plastic. However, this method uses a batch process and when the substrate is large, the productivity becomes low. Another way is to apply a coating of fluoropolymer solutions. The coating is done by a dipping process and is applicable for large substrates with high productivity. Though fluoropolymers have low reflective indexes, they also have very poor adhesion with plastic substrates. Improvement in the adhesion between fluoropolymers and substrate plastics has been long sought. The purpose of this invention is to provide the technology for low reflective index and good adhesion using fluoropolymer solutions.

SUMMARY OF THE INVENTION

The one layer coating system provided by the present invention consists of a fluorinated copolymer having the formula:

$VF_2/TFE/HFP$ wherein the molar ratio of Tetrafluoroethylene (TFE) to Hexafluoropropylene (HFP) is between 0.1 and 1.9, and the $VF_2$ content is 12 to 60 mole %. Preferably the $VF_2$ content is 12 to 50 mole % for PMMA substrates and 18 to 50 mole % for PC, PET, and PS substrates. More preferred is where the molar ratio of TFE to HFP is between 0.9 and 1.9, and the $VF_2$ content is preferably 12 to 50 mole % for Polymethylmethacrylate (PMMA) substrates and 18 to 50 mole % for Polycarbonate (PC), Polyethyleneterephthalate (PET), and Polysulfone (PS) substrates.

Also preferred is where the $VF_2$ content is greater than 50 mole % to 60 mole %; more preferred is where the substrate is PMMA, PC, PET or glass.

A one layer coating system is also provided by the present invention comprising a fluorinated copolymer having the formula $VF_2/HFP$ wherein the $VF_2$ content is about 40-80 mole %. Preferably, the $VF_2$ content is about 40-50 mole % and the substrate is PMMA. Also preferably, the $VF_2$ content is about 70-80 mole % and the substrate is glass.

A one layer coating system is also provided by the present invention comprising a fluorinated copolymer having the formula $VF_2/TFE/PMVE$ wherein the $VF_2$ content is about 18-60 mole % and the TFE/PMVE mole ratio is 0.1-1.9. Preferably the $VF_2$ content is about 30-35 mole %, the TFE/PMVE mole ratio is about 0.2-0.3 and the substrate is PMMA.

In the case of the present invention the two-layer coating system developed for PMMA, PC, PET, and PS substrates comprises an upper layer selected from the group consisting of:

a) poly(TFE/HFP) and poly($VF_2$/TFE/HFP), wherein the molar ratio of TFE to HFP is between about 0.3 and 1.9 and, in the case of the $VF_2$/TFE/HFP terpolymer, the concentration of $VF_2$ is about 19 mole %; and b) poly(TFE/perfluoro-2,2-dimethyldioxole) wherein the concentration of the perfluorodimethyldioxole is between 60 and 90 mole %;

and a lower coating layer selected from the group consisting of:

a) poly($VF_2$/TFE/HFP) wherein the ratio of TFE to HFP is between about 0.3 and 1.9 and the concentration of $VF_2$ is between about 18 and 60 mole % on PMMA substrates and between about 12 and 40 mole % on PC, PET, and PS substrates;

b) poly(VF/TFE/HFP) wherein the ratio of TFE to HFP is between about 2.1 and 0.9 and the concentration of VF is between about 42 and 58 mole %;

c) poly(VAc/TFE/HFIB) wherein the concentration of VAc is between 36 and 69 mole % and the concentration of HFIB is between 14 and 52 mole %; and d) TFE graft to PVOH wherein about 46 mole % TFE has been grafted to the PVOH.

More preferred is where the ratio of TFE to HFP is between about 0.9 and 1.9 in both the lower and upper layer, and wherein the concentration of $VF_2$ is between about 12 and 40 mole % when PC, PET, and PS substrates are utilized.

In the one layer coating system of the present invention, the thickness of the coating is preferably between about 10 and 1000 nm, more preferably, between about 30 and 120 nm, and most preferably between about 70 and 120 nm.

In the two coat system, the thickness of the upper layer is preferably between 10 and 1000 nm. More preferably, it is between 30 and 120 nm and most preferably, it is between 70 and 120 nm.

Another aspect of the invention is a new fluoropolymer composition prepared by the polymerization of vinyl acetate (VAc, $CH_3$—C(O)—OCH=$CH_2$), tetrafluoroethylene (TFE, $CF_2$=$CF_2$), and hexafluoroisobutylene (HFIB, $(CF_3)_2C$=$CH_2$).

DETAILED DESCRIPTION OF THE INVENTION

Both one layer and two layer systems have been found that afford low reflection coatings on optically clear plastic substrates. Preferred substrates are PMMA, PC, PET, and PS, and glass.

The one layer coating system provided by the present invention consists of a fluorinated copolymer having the formula $VF_2/TFE/HFP$ wherein the molar ratio of TFE to HFP is between 0.1 and 1.9 and the $VF_2$ content is preferably 12 to 60 mole % for PMMA substrates and 18 to 60 mole % for PC, PET, and PS substrates. These compositions balance the high fluorine content needed for low reflection, the high HFP content needed for optical clarity, and a sufficient $VF_2$ content to afford good adhesion to the substrate. More preferred is where the molar ratio of TFE to HFP is between 0.9 and 1.9, and the $VF_2$ content is preferably 12 to 60 mole % for PMMA substrates and 18 to 60 mole % for PC, PET, and PS substrates. Also preferred is where the $VF_2$ content is 50 to 60 mole % for glass substrates.

Another embodiment of the one layer system comprises a fluorinated copolymer having the formula $VF_2$/HFP wherein the $VF_2$ is about 40-60 mole %. Preferably, the $VF_2$ content is about 43 mole % and the substrate is PMMA.

Another embodiment of the one layer system comprises a fluorinated copolymer having the formula $VF_2$/TFE/PMVE wherein the $VF_2$ content is about 18-60 mole % and the TFE/PMVE mole ratio is 0.1-1.9. Preferably the $VF_2$ content is about 30-35 mole %, the TFE/PMVE mole ratio is about 0.2-0.3 and the substrate is PMMA.

Although many polymers have a high enough fluorine content to perform well as a low reflection coating, they often fail because of inadequate bonding to substrates such as PMMA, PC, PET, and PS. This adhesion problem has been solved by going to systems in which a lower adhesive coat bonds a low-reflective top coat to the substrate. In the case of the present invention, the two-layer coating system developed for PMMA, PC, PET, and PS substrates consists of fluoropolymers having the formulas Upper Coating Layer:
  Poly(TFE/HFP) and poly($VF_2$/TFE/HFP), wherein the molar ratio of TFE to HFP is between about 0.3 and 1.9 and, in the case of the $VF_2$/TFE/HFP terpolymer, the concentration of $VF_2$ is about 19 mole % or
  poly(TFE/perfluoro-2,2-dimethyldioxole) wherein the concentration of the perfluorodimethyldioxole is between 60 and 90 mole %

Lower Coating Layer:
  Poly($VF_2$/TFE/HFP) wherein the ratio of TFE to HFP is between about 0.3 and 1.9 and the concentration of $VF_2$ is between about 18 and 60 mole % on PMMA substrates and between about 12 and 50 mole % on PC, PET, and PS substrates or
  Poly(VF/TFE/HFP) wherein the ratio of TFE to HFP is between about 2.1 and 0.9 and the concentration of VF is between about 42 and 58 mole % or
  Poly(VAc/TFE/HFIB) wherein the concentration of VAc is between 36 and 69 mole % and the concentration of HFIB is between 14 and 52 mole % or
  A TFE graft to PVOH wherein about 46 mole % TFE has been grafted.

More preferred is where the ratio of TFE to HFP is between about 0.9 and 1.9 in both the lower and upper layer, and wherein the concentration of $VF_2$ is between about 12 and 40 mole % when PC, PET, and PS substrates are utilized.

The purpose of the lower layer in the present invention is to bond highly-fluorinated, low-reflection polymers to higher-reflection, hydrocarbon-polymer substrates. In order to be an effective adhesive agent, the polymer used for the adhesive layer combines perfluorocarbon monomers such as TFE and HFP with either partially fluorinated or hydrocarbon comonomers such as $VF_2$, HFIB, and VAc.

In the one layer coating system of the present invention, the coating needs to be thicker than about 10 nm in order to observe a significant reduction in reflectivity. While thicknesses greater than 10 nm work well, practical problems eventually arise as the coating is made thicker. For example, above about 1000 nm, thickness variation can become a problem, and, if the coating polymer is expensive, economics start to be prohibitive. Thus, in the one layer coating system of the present invention, the thickness of the coating is preferably between about 10 and 1000 nm, more preferably, between about 120 and 300 nm, most preferably, between about 70 and 120 nm.

In the two layer coating system of the present invention the thickness of the upper layer can be between 10 and 1000 nm. More preferably, it is between about 30 and 120 nm, most preferably between about 70 and 120 nm. The coating process for the present invention can include any process known in the art, including but not limited to dipping, spray, or spin coating method using polymer.

Another aspect of the invention is a new fluoropolymer composition prepared by the copolymerization of vinyl acetate (VAc, $CH_3$—C(O)—OCH═$CH_2$), tetrafluoroethylene (TFE, $CF_2$═$CF_2$), and hexafluoroisobutylene (HFIB, $(CF_3)_2$C═$CH_2$). The polymer can be produced using any free-radical polymerization method known in the art, including but not limited to bulk, solution or dispersion polymerization, using either nonaqueous or aqueous solvents. A preferred method is dispersion polymerization. Preferred solvents are water and tert-butanol/methyl acetate mixture. Dispersing agents can optionally be used; a preferred initiator is Vazo®52. The polymer can further be hydrolyzed, partially or completely, to provide a vinyl alcohol containing copolymer.

The polymer can be recovered from the reaction using any conventional procedure such as filtration, followed by washing and drying. The polymer product can be readily dissolved in many solvents such as acetone and used for casting films and surface coatings having the advantageous properties of fluoropolymers. One particular use is for preparing coatings having low reflective properties.

The coatings can be prepared using any method known in the art. Suitable solvents used for preparing the coatings are those which dissolve the coating composition but are inert to the substrate being coated. Preferred solvents include fluorosolvents such as Fluorinert® (3M Electronic Materials, St. Paul, Minn.), Vertrel® (E. I. DuPont de Nemours, Wilmington, Del.) or Novec® (3M Electronic Materials, St. Paul, Minn.), and ketone solvents such as methyl isobutyl ketone or acetone, isobutyl acetate, and combination of two or more thereof.

The following non-limiting Examples are meant to illustrate the invention but are not intended to limit it in any way.

MATERIALS AND METHODS

The following definitions are used herein and should be referred to for claim interpretation.
APS—Ammonium persulfate
HFIB—Hexafluoroisobutylene, $(CF_3)_2C=CH_2$
HFP—Hexafluoropropylene, $CF_2=CF-CF_3$
PC—Polycarbonate
PET—Polyethyleneterephthalate
PMMA—Polymethylmethacrylate
PMVE—Perfluoromethylvinylether
PVOH—Polyvinyl alcohol
PS—Polysulfone
Teflon® AF—TFE/Perfluoro-2,2-dimethyldioxole copolymer
TFE—Tetrafluoroethylene, $CF_2=CF_2$
VAc—Vinyl acetate, $CH_3-C(O)-OCH=CH_2$
VF—Vinyl fluoride, $CH_2=CHF$
$VF_2$—Vinylidene fluoride, $CF_2=CH_2$ Unless otherwise indicated, the following test methods were used:

Method of Measuring Transmission

Light transmission was measured at 500 nm using a Shimadzu #UV-3100 Spectrometer. This machine measures a continuous comparison of a split beam, part of which passes through the sample.

Adhesion Test Method

A tool with 10 razor blades separated by a distance of 1 mm was used to cut the coating down to the plastic substrate, drawing the razor blade tool first in one direction and then a second time in a perpendicular direction. This cuts 100 crosshatched squares. Scotch tape was applied to the crosshatched area with moderate pressure and pulled off rapidly. Adhesion is scored as the number of squares out of 100 still attached to the substrate.

VF2/TFE/HFP terpolymers and TFE/HFP copolymer having HFP contents in excess of 30 mole % are perhaps most easily made by polymerization at 14,000 psi and 200-400*C as described in U.S. Pat. Nos. 5,478,905 and 5,637,663. VF2/TFE/HFP terpolymers and the TFE/HFP dipolymers having lower HFP contents as well as VF2/TFE/PMVE terpolymers can be run under ordinary emulsion and bulk polymerization methods known in the art, see for instance Encyclopedia of *Polymer Science and Engineering*, 1989, Vol.16, pg. 601-603 and Vol. 7, pg. 257-269, John Wiley & Sons. Non-crystalline compositions showing good optical clarity and easy solution coatability were then selected for this invention.

PVOH grafted with TFE was prepared as in U.S. Pat. No. 5,847,048, hereby incorporated by reference. The polymer contained about 46 mole % TFE groups grafted to the vinyl alcohol.

The VAc/TFE/HFIB terpolymers were prepared as described in Examples 36 to 45 below.

EXAMPLES

Examples 1-9

Comparative Examples 1-3

One Coat Poly($VF_2$/TFE/HFP) on PMMA

Preferred Thickness Range

Solutions, 2 wt % poly($VF_2$/TFE/HFP) in Fluorinert® FC-75, were made by agitating chunks of the polymer with solvent for several days at room temperature. PMMA plates measuring 2.5 cm by 5.0 cm by 3 mm thick were used for testing. The PMMA plates were coated by lowering the plates into the polymer solution at a rate of 300 mm/min. and then, 30 seconds later, raising the plates back out of the solution at 2.5 to 1000 mm/min. After 5-10 minutes air drying, the plates were dried horizontally for 60 minutes in a 100° C. air oven. Examples are in order of increasing coating thickness.

TABLE 1

Single Coat of 18.7/43.3/38.0 mole % Poly($VF_2$/TFE/HFP) on PMMA

| | Thickness (nm) | Transmittance (%) |
|---|---|---|
| Comp. #1 | Uncoated PMMA control | 92.1 |
| Comp. #2 | 5.0 | 92.8 |
| Example #1 | 20.0 | 94.5 |
| Example #2 | 70.6 | 96.7 |
| Example #3 | 76.3 | 97.7 |
| Example #4 | 90.2 | 98.0 |
| Example #5 | 106.2 | 96.6 |
| Example #6 | 133.3 | 93.2 |
| Example #7 | 209.2 | 94.6 |
| Example #8 | 394.7 | 95.2 |
| Example #9 | 572.1 | 94.4 |
| Comp. #3 | 2000 | not uniform |

Uncoated PMMA showed 92.1% transmission. Coatings thicker than 20.0 nm and thinner than 1000 nm gave improved transmission (>93%) relative to uncoated PMMA. The highest transmissions (>96%) were shown by coatings ~30 to 120 nm thick.

Examples 10-13

Comparative Examples 4-5

One Coat Poly($VF_2$/TFE/HFP) on PMMA

Preferred $VF_2$ Content

Polymer films were prepared as in Examples 1 to 9. Transmittance and adhesion were measured with the results shown in Table 2 below which lists Examples and Comparative Examples in order of increasing $VF_2$ content.

TABLE 2

Adhesion by Standard Tape Pull Test
Single Coat Poly($VF_2$/TFE/HFP) on PMMA

| | Mole % $VF_2$/TFE/HFP | Adhesion (/100) | Transmittance (%) |
|---|---|---|---|
| Comp. #1 | Uncoated PMMA control | — | 92.1 |
| Comp. #4 | 0/57/43 Control | 0 | 97.2 |
| Comp. #5 | 7.8/60.3/31.8 | 64 | 97.5 |
| Example #10 | 12.6/51.3/36.1 | 96 | 97.2 |
| Example #11 | 18.7/43.3/38.0 | 99 | 97.9 |
| Example #12 | 25.2/42.9/31.9 | 100 | 95.1 |
| Example #13 | 37.4/28.9/33.7 | 100 | 96.0 |

Simultaneous good adhesion (>96/100) and improved transmission (>97%) relative to uncoated PMMA were observed for $VF_2$/TFE/HFP polymers with 12 to 50 mole % $VF_2$.

Example 14

A solution, 2 wt % poly($VF_2$/TFE/HFP=46.9/13.5/39.6 mole %) in Vertrel® XF, were made by agitating chunks of the polymer with solvent for several days at room temperature. PMMA plates measuring 2.5 cm by 5.0 cm by 3 mm thick were used for testing. The PMMA plates were coated by lowering the plates into the polymer solution at a rate of 300 mm/min. and then, 30 seconds later, raising the plates back out of the solution at 50 mm/min. After 5-10 minutes air drying, the plates were dried horizontally for 60 minutes in a 100° C. air oven. Transmittance and adhesion were measured with the results shown the table below which lists Examples.

TABLE 3

Single Coat of 46.9/13.5/39.6 mole % Poly(VF$_2$/TFE/HFP) on PMMA

|  | Mole %'s VF$_2$TFE/HFP | Adhesion (/100) | Transmittance (%) |
|---|---|---|---|
| Example #14B | 46.9/13.5/39.6 | 100 | 97.4 |
| Comp. #1 | Uncoated PMMA control | — | 92.1 |

Simultaneous good adhesion (100/100) and improved transmission (>97%) relative to uncoated PMMA were observed for VF$_2$/TFE/HFP = 46.9/13.5/39.6 mole % terpolymer.

Examples 15-18

Comparative Examples 6-8

Two Coats, Poly(VF$_2$/TFE/HFP) and Poly(HFP/TFE), on PMMA

Preferred VF$_2$ Content

Solutions, 1 wt % poly(VF$_2$/TFE/HFP) with 0-40 mole % VF$_2$ in Fluorinert® FC-75, and with 4-55 mole % VF$_2$ in acetone were made by agitating chunks of the polymer with solvent for several days at room temperature. PMMA plates measuring 2.5 cm by 5.0 cm by 3 mm thick were used for testing. The PMMA plates were coated by lowering the plates into the polymer solution at a rate of 300 mm/min. and then, 30 seconds later, raising the plates back out of the solution at 50 mm/min. After 5-10 minutes air drying, the plates were dried horizontally for 60 minutes in a 100° C. air oven. Examples and Comparative Examples are listed in order of increasing.

VF$_2$ content in the poly(VF$_2$/TFE/HFP) primer coat was varied. A 57 mole % TFE/43 mole % HFP top coat was used for all samples with a poly(VF$_2$/TFE/HFP) primer coat. Transmittance and adhesion were measured with the results shown in Table 4 below which lists the Examples and Comparative Examples in order of increasing thickness.

TABLE 4

Two Coat, Poly(VF$_2$/TFE/HFP) and Poly(HFP/TFE) on PMMA Preferred VF$_2$ Content

|  | Mole % VF$_2$/TFE/HFP | Adhesion (/100) | Transmittance (%) |
|---|---|---|---|
| Comp. #1 | Uncoated PMMA control | — | 92.1 |
| Comp. #4 | 0/57/43 Control | 0 | 97.2 |
| Comp. #6 | 7.8/60.3/31.8 | 0 | 97.7 |
| Comp. #7 | 12.6/51.3/36.1 | 4 | 97.5 |
| Example #15 | 18.7/43.3/38.0 | 90 | 97.7 |
| Example #16 | 49.3/27.7/23.0 | 100 | 97.3 |
| Example #17 | 52.0/25.9/22.1 | 98 | 97.5 |
| Example #18 | 61.0/21.7/17.3 | 80 | 97.4 |
| Comp. #8 | 66.2/16.9/16.9 | 6 | 97.1 |

Good adhesion with increased transmission relative to uncoated PMMA control was observed when the poly(VF$_2$/TFE/HFP) primer layer had VF$_2$ contents between about 18 and 60 mole %.

Examples 19-21

Two Coats both Poly(VF$_2$/TFE/HFP) on PMMA

Transmittance Independent of VF$_2$ Content of Primer Coat

Poly(VF$_2$/TFE/HFP) samples of different VF$_2$ content, see Table 5 below, were used for the primer coat. Solutions, 1 wt % poly(VF$_2$/TFE/HFP) in acetone, were made by agitating chunks of the polymer with solvent for several days at room temperature. PMMA plates measuring 2.5 cm by 5.0 cm by 3 mm thick were used for testing. The PMMA plates were coated by lowering the plates into the polymer solution at a rate of 300 mm/min. and then, immediately, raising the plates back out of the solution at 50 mm/min. After 5-10 minutes air drying, the plates were dried horizontally for 60 minutes in a 100° C. air oven. The topcoat, in every instance the same 18.7 mole % VF$_2$/43.3 mole % TFE/38.0 mole % HFP terpolymer, was prepared by the same method.

Table 5 below lists Examples and Comparative Examples in order of increasing VF$_2$ content.

TABLE 5

Two Poly(VF$_2$/TFE/HFP) Coats on PMMA

|  | Primer Coat Mole % VF$_2$/TFE/HFP | Adhesion (/100) | Transmittance (%) |
|---|---|---|---|
| Comp. #1 | Uncoated PMMA Control | — | 92.1 |
| Example 19 | 49.3/27.7/23.0 | 100 | 97.5 |
| Example 20 | 61.0/21.7/17.3 | 100 | 97.0 |
| Example 21 | 66.2/16.9/16.9 | 100 | 97.5 |

In spite of variation in VF$_2$ content from 49.3 to 66.2 mole % in the lower layer, overall transmittance is relatively unaffected. Adhesion is excellent (100/100) for VF$_2$ contents from 49.3 to 66.2 mole %.

Examples 22 to 24

Comparative Examples 9-12

One Coat Poly(VF$_2$/TFE/HFP) on Polycarbonate

Preferred VF$_2$ Content

Poly(VF$_2$/TFE/HFP) terpolymer samples of different VF$_2$ content were coated on polycarbonate (PC) sheet using the method of Example 14. The polycarbonate was manufactured by Kyoto-Jushi Seiko Co., Ltd. The polycarbonate sheets measured 2.5 cm×5.0 cm by 3 mm thick.

Transmission and adhesion were measured with the results shown in Table 6 below which lists Examples and Comparative Examples in order of increasing VF$_2$ content.

TABLE 6

Single Poly(VF$_2$/TFE/HFP) Coat on PC

|  | Mole %'s VF$_2$/TFE/HFP | Adhesion (/100) | Transmittance (%) |
|---|---|---|---|
| Comp. #9 | Uncoated PC Control | — | 87.2 |
| Comp. #10 | 0/57/43 | 0 | 95.2 |
| Comp. #11 | 7.8/60.3/31.8 | 0 | 90.5 |
| Comp. #12 | 12.6/51.3/36.1 | 53 | 94.7 |
| Example #22 | 18.7/43.3/38.0 | 70 | 94.0 |

TABLE 6-continued

Single Poly(VF₂/TFE/HFP) Coat on PC

|  | Mole %'s VF$_2$/TFE/HFP | Adhesion (/100) | Transmittance (%) |
|---|---|---|---|
| Example #23 | 25.2/42.9/31.9 | 100 | 92.0 |
| Example #24 | 37.4/28.9/33.7 | 100 | 93.8 |

VF$_2$ contents between about 18 and 40 mole % give improved adhesion (>70/100) relative to HFP/TFE copolymer (0/100) and improved transmission (>92%) relative to uncoated PC (87.2%).

Examples 25-28

Comparative Examples 13 to 14

Two Coats on Polycarbonate

Preferred VF$_2$ Content for Primer

Poly(VF$_2$/TFE/HFP) samples of different VF$_2$ content, see Table 7 below, were used for the primer coat. Solutions, 1 wt % poly(VF$_2$/TFE/HFP) in acetone, were made by agitating chunks of the polymer with solvent for several days at room temperature. PC plates (Kyoto-Jushi Seiko Co., Ltd.) measuring 2.5 cm by 5.0 cm by 3 mm thick were used for testing. The PC plates were coated by lowering the plates into the polymer solution at a rate of 300 mm/min. and then, immediately, raising the plates back out of the solution at 50 mm/min. After 5-10 minutes air drying, the plates were dried horizontally for 60 minutes in a 100° C. air oven.

The topcoat, in every instance the same 57.0 mole % TFE/43.0 mole % HFP copolymer, was prepared by the same method.

Table 7 below lists Examples and Comparative Examples in order of increasing VF$_2$ content.

TABLE 7

Two Coats on PC

|  | Primer Coat Mole % VF$_2$/TFE/HFP | Adhesion (/100) | Transmittance (%) |
|---|---|---|---|
| Comp. #9 | Uncoated PC control | — | 87.2 |
| Comp. #13 | 0/57/43 control | 68 | 93.8 |
| Comp. #14 | 7.8/60.3/31.8 | 12 | 91.6 |
| Example #25 | 12.6/51.3/36.1 | 83 | 94.2 |
| Example #26 | 18.7/43.3/38.0 | 96 | 92.3 |
| Example #27 | 25.2/42.9/31.9 | 88 | 93.4 |
| Example #28 | 37.4/28.9/33.7 | 97 | 93.2 |

VF$_2$ contents between about 12 and 40 mole % give improved adhesion (>83/100) relative to HFP/TFE dipolymer (68/100) and improved transmittance (>92.3%) relative to uncoated polycarbonate (87.2%).

Examples 29 to 31

Two Coats on PMMA

Use of Poly(VF/TFE/HFP) as Primer Coat

Preferred VF Content

A stirred jacketed stainless steel horizontal autoclave of 7.6 L (2 U.S. gal) capacity was used as the polymerization vessel. The autoclave was equipped with instrumentation to measure temperature and pressure and with a compressor that could feed monomer mixtures to the autoclave at the desired pressure. The autoclave was filled to 55-60% of its volume with deionized water containing 15 g of Zonyl® FS-62 surfactant (E.I. DuPont de Nemours, Wilmington, Del.?) and heated to 90° C. It was then pressured to 3.1 MPa (450 psig) with nitrogen and vented three times. The autoclave was precharged with monomers in the desired ratio, as shown in the table below, and brought to the working pressure of 3.1 MPa (450 psig). Initiator solution was prepared by dissolving 2 g APS in 1 L of deionized water. The initiator solution was fed to the reactor at a rate of 25 mL/min for a period of five minutes and then the rate was reduced and maintained at 1 mL/min for the duration of the experiment. For Examples 36 and 38 the autoclave was operated in a batch mode. The polymerization was terminated after a 10% pressure drop was observed by venting the remaining unconverted monomers and by reducing the autoclave temperature to room temperature.

For the 26.2/46.4/27.5 polymer, the autoclave was operated in a semibatch fashion in which a monomer mixture was added to the reactor to maintain constant pressure by means of the compressor as polymerization occurred. The composition of this make-up feed was different from the precharged mixture, as shown in the table below, because of the differences in monomer reactivity. The composition was selected to maintain a constant monomer composition in the reactor so compositionally homogeneous product was formed. Make-up monomer feed was admitted to the autoclave, through the compressor, by means of an automatic pressure regulated valve to maintain reactor pressure. Monomer feeds were continued until a predetermined amount to give the final latex solids was fed to the autoclave. The feed was then stopped and the contents of the autoclave were cooled and vented.

In all cases, the polymer latex was easily discharged to a receiver as a milky homogeneous mixture. Polymer was isolated on a suction filter after adding 15 g of ammonium carbonate dissolved in water per liter of latex followed by 70 mL of HFC-4310 (1,1,1,2,3,4,4,5,5,5-decafluoropentane) per liter of latex with rapid stirring. The filter cake was washed with water and dried in an air over at 90-100° C.

TABLE 8

| Monomer Precharge TFE/VF/HFP (wt %) | Monomer Make-up TFE/VF/HFP (wt %) | Monomer Fed (g) | Polymer Comp. Solids (wt %) | Polymer (g) | TFE/VF/HFP (wt %) |
|---|---|---|---|---|---|
| 15/3/82 |  | 750.9 | 2.1 | 96.6 | 38.3/42.8/19 |
| 9/3/88 | 29/46/25 | 1702 | 18.3 | 1063 | 26.2/46.4/27.5 |
| 10/10/80 |  | 636.1 | 2.2 | 99.7 | 20.3/57.8/22 |

Poly(VF/TFE/HFP) samples of different VF content, see Table 9 below, were used for the primer coat. Solutions, 2 wt % poly(VF/TFE/HFP) in acetone, were made by agitating chunks of the polymer with solvent for several days at room temperature. PMMA plates measuring 2.5 cm by 5.0 cm by 3 mm thick were used for testing. The PMMA plates were coated by lowering the plates into the polymer solution at a rate of 300 mm/min. and then, immediately, raising the plates back out of the solution at 50 mm/min. After 5-10 minutes air drying, the plates were dried horizontally for 60 minutes in a 100° C. air oven.

The topcoat, in every instance the same 57 mole % TFE/43 mole % HFP polymer, was prepared by the same method.

Table 9 below lists Examples in order of increasing VF content.

TABLE 9

Two Coats, VF/TFE/HFP Primer, on PMMA

|  | Primer Coat Mole %'s VF/TFE/HFP | Adhesion (/100) | Transmittance (%) |
|---|---|---|---|
| Comp. #1 | Uncoated PMMA control | — | 92.1 |
| Example #29 | 42.8/38.3/19.0 | 99 | 96.3 |
| Example #30 | 46.4/26.2/27.5 | 100 | 97.3 |
| Example #31 | 57.8/20.8/22.0 | 100 | 96.0 |

For VF contents from about 42 to 58 mole %, use of poly(VF/TFE/HFP) as the primer coat gives excellent transmittance (>96.0%) relative to uncoated PMMA (92.1%) along with excellent adhesion (>99/100).

Example 32

Two Coats on PMMA

Use of Graft of TFE to PVOH as Primer Coat

A poly(vinyl alcohol) to which 46 mole % TFE had been grafted (PVOH-g-TFE) was used for the primer coat. A solution, 2 wt % in acetone, was made by agitating chunks of the polymer with solvent for several days at room temperature. PMMA plates measuring 2.5 cm by 5.0 cm by 3 mm thick were used for testing. The PMMA plates were coated by lowering the plates into the polymer solution at a rate of 300 mm/min. and then, immediately, raising the plates back out of the solution at 50 mm/min. After 5-10 minutes air drying, the plates were dried horizontally for 60 minutes in a 100° C. air oven.

The topcoat, an 57 mole % TFE/43 mole % HFP polymer, was prepared by the same method.

Table 10 below gives adhesion and transmission results.

TABLE 10

Two Coats, PVOH-g-TFE Primer, on PMMA

|  | Primer Coat PVOH-g-TFE | Adhesion (/100) | Transmittance (%) |
|---|---|---|---|
| Comp. #1 | Uncoated PMMA control | — | 92.1 |
| Example #32 | 46 mole % TFE | 97 | 97.1 |

Use of poly(PVOH-g-TFE) as the primer coat gave excellent transmittance (97.1%) relative to uncoated PMMA (92.1%) along with excellent adhesion (97/100).

Example 33

Comparative Examples 15-16

One Coat Poly(VF$_2$/TFE/HFP) on PET

Coatings were prepared as in Examples 1 to 9. PET sheets measuring 2.5 by 5.0 cm by 0.12 mm thick were used as substrate. Transmittance and adhesion were measured with the results shown in the table below which lists Examples and Comparative Examples.

TABLE 11

Poly(VF$_2$/TFE/HFP) Coat on PET

|  | Mole %'s VF$_2$/TFE/HFP | Adhesion (/100) | Transmittance (%) |
|---|---|---|---|
| Comp. #15 | Uncoated PET control | — | 85.0 |
| Comp. #16 | 0/57/43 | 2 | 96.0 |
| Example #33 | 18.7/43.3/38.0 | 99 | 96.0 |

Uncoated PET showed 85.0% transmission. Simultaneous good adhesion (>99/100) and improved transmission (>96%) relative to uncoated PET were observed.

Example 34

Comparative Example 17-18

One Coat Poly(VF$_2$/TFE/HFP) on Polysulfone

Coatings were prepared as in Example 1 to 9. Polysulfone sheets measuring 2.5×5.0 cm by 0.05 mm thick were as substrate. Transmittance and adhesion results are shown in the table below which lists Examples and Comparative Examples.

TABLE 12

Single Coat Poly(VF$_2$/TFE/HFP) on Polysulfone

|  | Mole %'s VF$_2$/TFE/HFP | Adhesion (/100) | Transmittance (%) |
|---|---|---|---|
| Comp. #17 | Uncoated PS | — | 88.5 |
| Comp. #18 | 0/57/43 | 97 | 98.2 |
| Example #34 | 18.7/43.3/38.0 | 100 | 95.0 |

Uncoated polysulfone showed 88.5% transmittance. Simultaneous good adhesion (>97/100) and improved transmission (>95%) relative to uncoated polysulfone (88.5%) were observed.

Example 35

Comparative Example 19

Two coat polymer films were prepared on PMMA sheet as in Examples 15-18. A Teflon® AF top coat was used. Transmittance and adhesion were measured with the results shown in the table below which lists the Examples and Comparative Examples.

TABLE 13

Two Coats, Poly(VF$_2$/TFE/HFP) and Teflon ® AF, on PMMA

|  | Mole %'s VF$_2$/TFE/HFP | Adhesion (/100) | Transmittance (%) |
|---|---|---|---|
| Comp. #1 | Uncoated PMMA control | — | 92.1 |
| Comp. #19 | AF1600 control (no lower coat) | 0 | 98.1 |

TABLE 13-continued

Two Coats, Poly(VF$_2$/TFE/HFP) and Teflon ® AF, on PMMA

| | Mole %'s VF$_2$/TFE/HFP | Adhesion (/100) | Transmittance (%) |
|---|---|---|---|
| Example #35 | 49.3/27.7/23.0 | 100 | 98.0 |

Adhesion was 100/100 for the two coat sheet (VF$_2$/TFE/HFP and Teflon® AF) but only 0/100 for the sheet with a single coating of Teflon® AF. This shows that poly(VF$_2$/TFE/HFP) is an effective primer that further improves the adhesion of Teflon® AF.

Transmittance at 500 nm was 98.0% for two coat sheet (VF$_2$/TFE/HFP and AF) but only 92.1 for uncoated PMMA control. This shows that Teflon® AF is an effective top coat that further improves the transmittance of poly(VF$_2$/TFE/HFP).

Examples 36-45

Aqueous Polymerization of VAc/TFE/HFIB. A 1-L stirred vertical autoclave was charged with a solution of 0.3 g of Plasdone K-90 (steric stabilizer) and 5 mL isopropanol (chain transfer agent) in 400 mL of deionized water. Vinyl acetate (126 g, 1.47 mole) and 0.6 g of Vazo® 52 were added. The vessel was closed, pressurized to 100 psi with nitrogen and vented twice. The vessel was pressured to 295 psi with nitrogen as a leak test and vented. The vessel was cooled to about −4° C., evacuated and charged with 42 g (0.26 mol) of hexafluoroisobutylene and 42 g (0.42 mol) of tetrafluoroethylene. With stirring at 750 rpm, the vessel contents were heated to 70° C. and maintained for 3 hr. The contents was heated to 85° C. and maintained for 3 hr. After cooling to room temperature and venting to atmospheric pressure, the aqueous suspension was removed from the vessel using water as necessary to rinse. An additional 350 mL of deionized water were added and the white suspension was heated with stirring on a hot plate until about 250 mL of solution had evaporated. After cooling to room temperature, the solid was easily filtered on a sintered glass funnel and washed with deionized water. It was dried in a vacuum oven at 90° C. overnight giving 181.8 g (87%) of white polymer.

Nonaqueous Polymerization of VAc/TFE/HFIB. A 1-L stirred vertical autoclave was charged with a solution of 126 g of vinyl acetate in 110 g of methyl acetate and 200 g of tert-butanol. The vessel was closed, pressurized to 100 psi with nitrogen and vented twice. The vessel was pressured to 295 psi with nitrogen as a leak test and vented. The vessel was cooled to about −4° C., evacuated and charged with 63 g of tetrafluoroethylene and 21 g of HFIB. With stirring at 750 rpm, the vessel contents were heated to 70° C. A solution (25 mL) of 0.2 g Vazo® 52 in 25 mL methyl acetate was injected at 5 ml/min. After 3 hr. the vessel contents were allowed to cool to room temperature and the remaining gases were vented. The viscous solution was removed from the vessel by suction, diluting with acetone as necessary to lower solution viscosity. The polymer solution, further diluted with acetone if necessary to give a clear solution, was added slowly in 30-45 mL portions to 16 oz of deionized water and a small amount of ice in a blender. The precipitated solid was filtered in a sintered glass funnel. After all polymer had been precipitated the combined solids were washed in portions with water, filtered and pressed with a rubber dam. The solid was dried for several hours in a vacuum oven with a slow nitrogen purge at 110-115° C. The resulting white solid weighed 141.1 g (67%).

Table 14 below gives results for polymerizations carried out by one of the methods listed above.

Vinyl acetate content was determined by hydrolysis of the acetate groups using excess of sodium hydroxide in refluxing THF, followed by titration of excess base by standard hydrochloric acid solution. GPC analyses were conducted using THF as solvent and polystyrene standards. Elemental analyses were done by Schwarkkoff Microanalytical Laboratory. $^{19}$F NMR spectra were generally measured in THF-d6 solutions using TMS and CFC-11 as internal standards. $^{19}$F NMR was used to assign relative amounts of the two fluorinated monomers from integration of the CF$_3$ groups of HFIB at −66 to −70 versus the CF$_2$ groups from TFE at −110 to −126.

TABLE 14

| Ex. | Monomers (g) | Weight Ratio Feed/(Product[a]) | Polym. Solv.[b] | Reactor | g. Yield (%) | Wt. % VAc | F NMR (mole %) | Refractive Index | Inh. Visc. | % F[c] | GPC Mw/Mn/Pd |
|---|---|---|---|---|---|---|---|---|---|---|---|
| 36 | VAc (52) | 40:23:37 | t-BuOH | 400 mL | 94.6 (72) | 39.0 | TFE 31% | 1.4111 | 0.41 | 38.92 | 148,000 |
| | TFE (30) | (39:13:48) | MeAc | | | | HFIB 69% | | | | 84,900 |
| | HFIB (49) | | | | | | | | | | 1.75 |
| 37 | VAc (86) | 39:23:38 | Water | 1 L | 175.6 (81) | 35.5 | TFE 28% | 1.4169 | 0.38 | 36.70 | 177,000 |
| | TFE (50) | (36:12:52) | PVP | | | | HFIB 72% | | | | 82,500 |
| | HFIB (82) | | | | | | | | | | 2.15 |
| 38 | VAc (103) | 49:19:32 | Water | 1 L | 182.5 (87) | 50.2 | TFE 33% | 1.4191 | 0.52 | 31.09 | 252,000 |
| | TFE (40) | (50:12:38) | PVP | | | | HFIB 67% | | | | 81,800 |
| | HFIB (66) | | | | | | | | | | 3.08 |
| 39 | VAc (126) | 60:20:20 | Water | 1 L | 181.8 (87) | 58.1 | TFE 50% | 1.4307 | 0.79 | 22.95 | 349,000 |
| | TFE (42) | (58:16:26) | PVP | | | | HFIB 50% | | | | 120,000 |
| | HFIB (42) | | | | | | | | | | 2.90 |
| 40 | VAc (126) | 60:30:10 | Water[d] | 1 L | 172.9 (82) | 68.6 | TFE 73% | 1.4368 | 1.98 | 20.83 | 786,000 |
| | TFE (63) | (69:19:12) | PVP | | | | HFIB 27% | | | | 208,000 |
| | HFIB (21) | | | | | | | | | | 3.77 |

TABLE 14-continued

| Ex. | Monomers (g) | Weight Ratio Feed/(Product[a]) | Polym. Solv.[b] | Reactor | g. Yield (%) | Wt. % VAc | F NMR (mole %) | Refractive Index | Inh. Visc. | % F[c] | GPC Mw/Mn/Pd |
|---|---|---|---|---|---|---|---|---|---|---|---|
| 41 | VAc (147) TFE (42) HFIB (21) | 70:20:10 (71:16:13) | Water[d] PVP | 1 L | 186.3 (89) | 70.7 | TFE 66% HFIB 34% | 1.4439 | 2.01 | 17.69 | 857,000 243,000 3.52 |
| 42 | VAc (126) TFE (63) HFIB (21) | 60:30:10 (62:24:14) | t-BuOH MeAc | 1 L | 141.1 (67) | 61.5 | TFE 74% HFIB 26% | 1.4284 | 0.78 | 26.22 | 235,000 100,000 2.33 |
| 43 | VAc (126) TFE (42) HFIB (42) | 60:20:20 (57:15:27) | t-BuOH MeAc | 1 L | 148.4 (71) | 57.2 | TFE 48% HFIB 52% | 1.4198 | 0.59 | 29.83 | 204.000 116,000 1.76 |
| 44 | VAc (147) TFE (42) HFIB (21) | 70:20:10 (66:19:15) | t-BuOH MeAc | 1 L | 142.5 (68) | 66 | TFE 68% HFIB 32% | 1.4353 | 0.78 | 22.33 | 230,000 126,000 1.82 |
| 45 | VAc (147) TFE (42) HFIB (21) | 70:20:10 (69:17:14) | Water PVP | 1 L | 187.1 (89) | 68.8 | TFE 68% HFIB 32% | 1.4422 | 1.09 | 17.83 | 437,000 145,000 3.0 |

[a]Vinyl acetate content determined by hydrolysis of the acetate groups using standard base, fluoromonomer incorporation was determined by $^{19}$F NMR.
[b]Polyvinyl pyrrolidone (0.3 g) used as dispersing agent and isopropanol (5 mL) used as chain transfer agent in aqueous polymerizations.
[c]Elemental analysis
[d]No chain transfer agent used.

Examples 46-48

Two Coats on PMMA

Use of Poly(VAc/TFE/HFIB) as Primer Coat

Preferred VAc Content

Poly(VAc/TFE/HFIB) samples of different VAc content, see Table 15 below, were used for the primer coat. Solutions, 2 wt % poly(VAc/TFE/HFIB) in acetone, were made by agitating chunks of the polymer with solvent for several days at room temperature. PMMA plates measuring 2.5 cm by 5.0 cm by 3 mm thick were used for testing. The PMMA plates were coated by lowering the plates into the polymer solution at a rate of 300 mm/min. and then, immediately, raising the plates back out of the solution at 50 mm/min. After 5-10 minutes air drying, the plates were dried horizontally for 60 minutes in a 100° C. air oven.

The topcoat, in every instance the same 57 mole % TFE/43 mole % HFP polymer, was prepared by the same method.

Table 15 below lists Examples and in order of increasing VAc content.

TABLE 15

Two Coats, VAc/TFE/HFIB Primer, on PMMA

| | Primer Coat Mole % VAc/TFE/HFIB | Adhesion (/100) | Transmittance (%) |
|---|---|---|---|
| Comp. #1 | Uncoated PMMA control | — | 92.1 |
| Example #46 | 36/12/52 | 100 | 96.8 |
| Example #47 | 58/16/26 | 100 | 97.6 |

TABLE 15-continued

Two Coats, VAc/TFE/HFIB Primer, on PMMA

| | Primer Coat Mole % VAc/TFE/HFIB | Adhesion (/100) | Transmittance (%) |
|---|---|---|---|
| Example #48 | 69/17/14 | 100 | 97.3 |

For VAc contents from about 36 to 69 mole %, use of poly(VAc/TFE/HFIB) as the primer coat gives excellent transmittance (>96.8%) relative to uncoated PMMA (92.1%) along with excellent adhesion (100/100).

Examples 49-55

Comparative Examples 20-23

Solutions of 2.5 wt % poly(VF2/TFE/HFP) in Novec® HFE-7100 (3M Electronic Materials, St. Paul, Minn.) and poly(TFE/HFP) in Fluorinert® (3M Electronic Materials, St. Paul, Minn.) FC-75, were made by agitating chunks of the polymer with solvent for several days at room temperature. PMMA and PC plates measuring 2.5 cm by 5.0 cm by 3 mm thick, PET films measuring 2.5 cm by 5.0 cm by 120 micron meter thick and glass plates 2.5 cm by 5.0 cm by 1 mm thick were used for testing. The plates were coated by lowering the plates into the polymer solution at a rate of 300 mm/min. and then, 30 seconds later, raising the plates back out of the solution at 125 mm/min. After 5-10 minutes air drying, the plates were dried for 10 minutes in an air oven. The temperature was 100° C. for PMMA, 120° C. for PC and 300° C. for glass plates. The PET films were dried for 60 minutes in a 100° C. air oven. Transmittance, adhesion and coating thickness were measured with the results shown in Table 16.

TABLE 16

|  | Example #49 | Example #50 | Example #51 | Example #52 | Example #53 |
|---|---|---|---|---|---|
| VF2 (mol %) | 48 | 50 | 52 | 57 | 50 |
| HFP (mol %) | 45 | 23 | 22 | 34 | 23 |
| TFE (mol %) | 7 | 27 | 26 | 9 | 27 |
| Substrate | PMMA | PMMA | PMMA | PMMA | PC |
| Thickness (nm) | 90 | 90 | 90 | 90 | 90 |
| Adhesion (/100) | 100 | 100 | 100 | 100 | 100 |
| Transmittance(%) | 97 | 98 | 97 | 97 | 95 |

|  | Example #55 | Comp. #20 | Comp. #21 | Comp. #22 | Comp. #23 |
|---|---|---|---|---|---|
| VF2 (mol %) | 50 | — | — | — | — |
| HFP (mol %) | 23 | — | — | — | — |
| TFE (mol %) | 27 | — | — | — | — |
| Substrate | Glass | PMMA | PC | PET | Glass |
| Thickness (nm) | 90 | Uncoated | Uncoated | Uncoated | Uncoated |
| Adhesion (/100) | 100 | — | — | — | — |
| Transmittance(%) | 96 | 92 | 87 | 90 | 90 |

Simultaneous good adhesion (>96/100) and improved transmittance (>95%) relative to uncoated substrates were observed for VF2/TFE/HFP polymers with 40 to 60 mole % VF2.

Examples 56-57

Solutions, 2.5 wt % poly(VF2/HFP=43/57 mole %) in Vertrel® XF (E. I. DuPont de Nemours, Wilmington, Del.) and poly(VF2/HFP=78/22 mole %) in MIBK, were made by agitating chunks of the polymer with solvent for several days at room temperature. PMMA plates measuring 2.5 cm by 5.0 cm by 3 mm thick and glass plates 2.5 cm by 5.0 cm by 1 mm thick were used for testing. Polymer films were prepared as in Examples 49 to 55 with a thickness of 90 nm Lifting up speed was 200 mm/min. Transmittance and adhesion were measured with the results shown in Table 17.

TABLE 17

|  | Example #56 | Example #57 |
|---|---|---|
| VF2 (mol%) | 43 | 78 |
| HFP (mol%) | 57 | 22 |
| Substrate | PMMA | Glass |
| Adhesion(/100) | 100 | 100 |
| Transmittance(%) | 95 | 95 |

Simultaneous good adhesion (>96/100) and improved transmittance (>95%) relative to uncoated PMMA and glass were observed for VF2/HFP polymers with 40 to 80 mole % VF2.

Example 58

Solutions, 3 wt % poly(VF2/TFE/PMVE=32/15/53 mole %) in Novec® HFE-7200 (3M Electronic Materials, St. Paul, Minn.) were made by agitating chunks of the polymer with solvent for several days at room temperature. PMMA plates measuring 2.5 cm by 5.0 cm by 3 mm thick were used for testing. Polymer films were prepared as in Examples 1 to 7. Lifting up speed was 75 mm/min. Transmittance and adhesion were measured with the results shown in Table 18.

TABLE 18

|  | Example #58 |
|---|---|
| VF2 (mol %) | 32 |
| TFE (mol %) | 15 |

TABLE 18-continued

|  | Example #58 |
|---|---|
| PMVE (mol %) | 53 |
| Substrate | PMMA |
| Adhesion(/100) | 100 |
| Transmittance(%) | 98 |

Simultaneous good adhesion (>96/100) and improved transmittance (>95%) relative to uncoated PMMA were observed.

What is claimed is:

1. A one layer coating system on a substrate, wherein the coating comprises a fluorinated copolymer having the formula $$VF_2/TFE/HFP$$

wherein the molar ratio of TFE to HFP is between 0.1 and 1.9 and the $VF_2$ content is 50 to 60 mole %, wherein the coating has a thickness between 10 nm and 1000 nm and that adheres without chemical bonding, and wherein the transparency of the substrate increases by at least 3%.

2. The coating system of claim 1 wherein the $VF_2$ content is 12 to 50 mole %, the molar ratio of TFE to HFP is between 0.9 and 1.9, and the substrate is PMMA.

3. The coating system of claim 1 wherein the $VF_2$ content is 18 to 50 mole %, the molar ratio of TFE to HFP is between 0.9 and 1.9, and the substrate is selected from the group consisting of PC, PET, and PS.

4. The coating system of claim 1 wherein the substrate is selected from the group consisting of PMMA, PC, PET and glass.

5. The coating of claim 1 wherein the thickness of the coating is between 70 nm and 120 nm.

6. A coated article comprising a substrate and the coating of claim 1.

* * * * *